US010655460B2

(12) United States Patent
Segura Dominguez

(10) Patent No.: US 10,655,460 B2
(45) Date of Patent: May 19, 2020

(54) INTEGRATED OPTICAL MODULE FOR DOWNHOLE TOOLS

(71) Applicant: Schlumberger Technology Corporation, Sugar Land, TX (US)

(72) Inventor: Jordi Juan Segura Dominguez, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 215 days.

(21) Appl. No.: 15/276,335

(22) Filed: Sep. 26, 2016

(65) Prior Publication Data

US 2018/0087375 A1 Mar. 29, 2018

(51) Int. Cl.
*E21B 47/12* (2012.01)
*H04J 14/02* (2006.01)

(52) U.S. Cl.
CPC ............ *E21B 47/123* (2013.01); *H04J 14/02* (2013.01)

(58) Field of Classification Search
CPC ................................ H04J 14/02; E21B 47/123
See application file for complete search history.

(56) References Cited

U.S. PATENT DOCUMENTS

| 7,515,774 | B2 | 4/2009 | Vannuffelen et al. |
| 7,929,812 | B2 | 4/2011 | Vannuffelen et al. |
| 2005/0015426 | A1* | 1/2005 | Woodruff ................ H04J 14/02 709/200 |
| 2008/0247273 | A1* | 10/2008 | Chemali ............... E21B 17/028 367/82 |
| 2009/0033332 | A1 | 2/2009 | Goodman |
| 2009/0224936 | A1* | 9/2009 | Vannuffelen .......... E21B 47/123 340/854.7 |
| 2013/0223809 | A1* | 8/2013 | Dunphy ................ E21B 47/123 385/139 |
| 2014/0292530 | A1 | 10/2014 | Weerasinghe et al. |
| 2015/0369949 | A1 | 12/2015 | Cuevas et al. |

(Continued)

FOREIGN PATENT DOCUMENTS

WO 2014210513 A1 12/2014

OTHER PUBLICATIONS

International Search Report issued in International Patent Application No. PCT/US2017/053352 dated Jan. 4, 2018; 4 pages.

(Continued)

*Primary Examiner* — Curtis B Odom
(74) *Attorney, Agent, or Firm* — Cathy Hewitt

(57) ABSTRACT

A downhole tool conveyable within a wellbore and able to optically communicate with surface equipment. The downhole tool includes a processing system operable to process electronic downlink signals and generate electronic uplink signals. The downhole tool further includes an integrated module having an optical interface able to receive multiplexed optical downlink signals from the surface equipment and to transmit multiplexed optical uplink signals to the surface equipment, a multiplexer/demultiplexer able to demultiplex the multiplexed optical downlink signals into carrier optical downlink signals, and to multiplex carrier optical uplink signals into the multiplexed optical uplink signals, a receiver able to convert the carrier optical downlink signals into the electronic downlink signals, and a transmitter able to convert the electronic uplink signals into the carrier optical uplink signals.

19 Claims, 7 Drawing Sheets

(56) References Cited

U.S. PATENT DOCUMENTS

2017/0211380 A1  7/2017  Segura et al.
2018/0016893 A1* 1/2018  Bhongale .............. E21B 47/12
2018/0106927 A1* 4/2018  Larimore .............. E21B 43/04

OTHER PUBLICATIONS

Written Opinion issued in International Patent Application No. PCT/US2017/053352 dated Jan. 4, 2018; 13 pages.

* cited by examiner

INTEGRATED OPTICAL MODULE FOR DOWNHOLE TOOLS

BACKGROUND OF THE DISCLOSURE

Wells are generally drilled into a land surface or ocean bed to recover natural deposits of oil and gas, as well as other natural resources that are trapped in geological formations in the Earth's crust. Wellbores may be drilled along a trajectory to reach one or more subterranean rock formations containing the hydrocarbons and other downhole fluids. Information about the subsurface formations and formation fluid, such as measurements of the formation pressure, formation permeability, and recovery of formation fluid samples, may be utilized to increase well production and to predict the economic value, the production capacity, and the production lifetime of a subsurface formation. Downhole tools, such as formation testers, may perform evaluations in real-time during sampling of the formation fluid.

In working with deeper and more complex wellbores, it becomes more likely that downhole tools, tool strings, and/or other downhole apparatus may include numerous testing, navigation, and/or communication tools, resulting in increasingly larger quantities or volumes of data being generated and, thus, utilizing increasingly larger data bandwidths to communicate the data to the wellsite surface.

Communicating with downhole tools conveyed into a wellbore via coiled tubing is complicated by the rotational motion of the coiled tubing reel, which limits the number and types of data pathways available between the downhole tools and the wellsite surface. Electrical pathways support transfer of electronic data between the downhole tools and the wellsite surface, but limit data transfer bandwidth. Although optical communications have existed in the oilfield industry for years, typical optical communication systems comprise custom designs with discrete components, resulting in large footprints, high cost, low reliability, and/or limited temperature ranges.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a downhole tool conveyable within a wellbore and able to optically communicate with surface equipment disposed at a wellsite surface from which the wellbore extends. The downhole tool includes a processing system secured within a housing of the downhole tool. The processing system includes a processor and memory, and is operable to process electronic downlink signals and generate electronic uplink signals. The downhole tool also includes an integrated module able to receive multiplexed optical downlink signals originating from the surface equipment and transmit multiplexed optical uplink signals toward the surface equipment. The integrated module includes multiple components each attached to a frame secured within the housing. The components include a wavelength-division multiplexer/demultiplexer, a receiver, and a transmitter. The wavelength-division multiplexer/demultiplexer is able to demultiplex the multiplexed optical downlink signals into carrier optical downlink signals, and to multiplex carrier optical uplink signals into the multiplexed optical uplink signals. The receiver is able to convert the carrier optical downlink signals into the electronic downlink signals. The transmitter is able to convert the electronic uplink signals into the carrier optical uplink signals. The downhole tool also includes circuitry able to communicate the electronic downlink signals and the electronic uplink signals to and from, respectively, the processing system.

The present disclosure also introduces an integrated optical module including a frame, multiple components each attached to the frame, and circuitry. The components include a processing system, an optical interface, a wavelength-division multiplexer/demultiplexer, a receiver, and a transmitter. The processing system is operable to process electronic incoming signals and generate electronic outgoing signals. The optical interface is able to receive multiplexed optical incoming signals and transmit multiplexed optical outgoing signals. The wavelength-division multiplexer/demultiplexer is able to demultiplex the multiplexed optical incoming signals into carrier optical incoming signals, and to multiplex carrier optical outgoing signals into the multiplexed optical outgoing signals. The receiver is able to convert the carrier optical incoming signals into the electronic incoming signals. The transmitter is able to convert the electronic outgoing signals into the carrier optical outgoing signals. The circuitry is able to communicate the electronic incoming signals and the electronic outgoing signals to and from, respectively, the processing system.

The present disclosure also introduces an apparatus including a tool string conveyable within a wellbore and able to optically communicate with surface equipment disposed at a wellsite surface from which the wellbore extends. The tool string includes downhole tools connected end-to-end to form the tool string. The downhole tools each comprise respective instances of a processing system, an integrated module, and circuitry. The processing system is secured within a housing of the downhole tool, and includes a processor and memory collectively operable to process electronic downlink signals and generate electronic uplink signals. The integrated module includes multiple components each attached to a frame secured within the housing. The components include an optical interface, a wavelength-division multiplexer/demultiplexer, a receiver, and a transmitter. The optical interface is able to receive multiplexed optical downlink signals originating from the surface equipment, and to transmit multiplexed optical uplink signals toward the surface equipment. The wavelength-division multiplexer/demultiplexer is able to demultiplex the multiplexed optical downlink signals into carrier optical downlink signals, and to multiplex carrier optical uplink signals into the multiplexed optical uplink signals. The receiver is able to convert the carrier optical downlink signals into the electronic downlink signals. The transmitter is able to convert the electronic uplink signals into the carrier optical uplink signals. The circuitry is able to communicate the electronic downlink signals and the electronic uplink signals to and from, respectively, the processing system.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying fig

DETAILED DESCRIPTION

Figure 1:
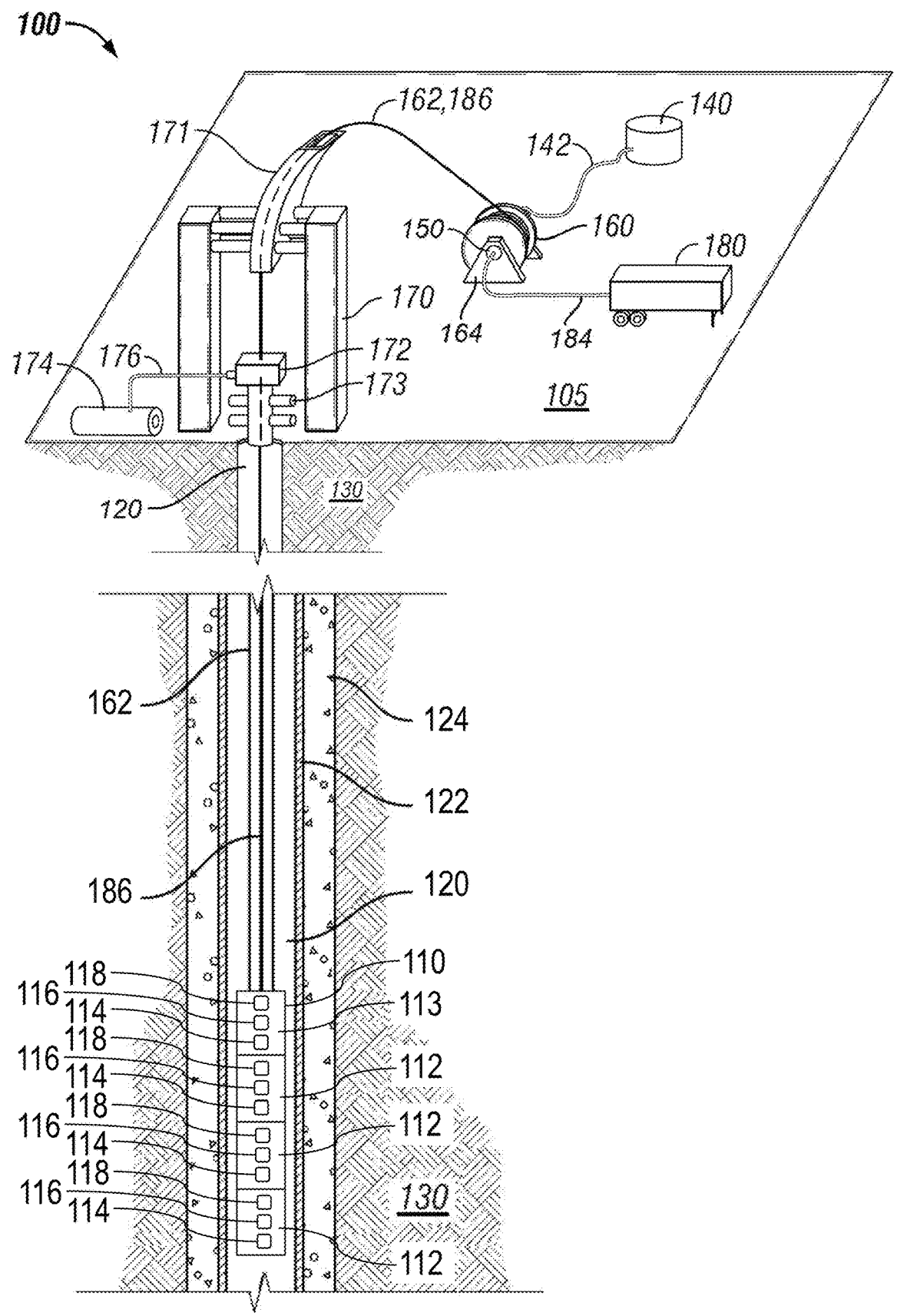
- FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

With the advancement of oilfield technology, downhole tools used for measurements have increased demand for data transfer rates and link quality. During downhole operations, optical telemetry may permit communication of large volumes of data without compromising its quality. Optical telemetry may be utilized to communicate data between the wellsite surface and the tool string located downhole. Optical communication may also be utilized to permit data to be communicated between each of the downhole tools of the tool string. Example implementations of an apparatus described herein relate generally to an integrated optical module (IOM) for use with a variety of different downhole tools and operable to facilitate optical communication between the wellsite surface and the downhole tool and/or to facilitate optical communication between the downhole tools of the tool string. In both communication scenarios, optical communication may be provided via a reduced number of optical conductors (e.g., optical fibers) or paths.

FIG. 1 is a schematic view of at least a portion of an example wellsite system 100 according to one or more aspects of the present disclosure, representing an example coiled tubing environment in which one or more apparatus described herein may be implemented, including to perform one or more methods and/or processes also described herein. However, one or more aspects of the present disclosure are also applicable to implementations in which wireline, slickline, and/or other conveyance means are utilized instead of or in addition to coiled tubing.

FIG. 1 depicts a wellsite surface 105 upon which various wellsite equipment is disposed proximate a wellbore 120. FIG. 1 also depicts a sectional view of the Earth below the wellsite surface 105 containing the wellbore 120, as well as a tool string 110 positioned within the wellbore 120. The wellbore 120 extends from the wellsite surface 105 into one or more subterranean formations 130. When utilized in cased-hole implementations, a cement sheath 124 may secure a casing 122 within the wellbore 120. However, one or more aspects of the present disclosure are also applicable to open-hole implementations, in which the cement sheath 124 and the casing 122 have not yet been installed in the wellbore 120.

At the wellsite surface 105, the wellsite system 100 may comprise a control center 180 comprising processing and communication equipment operable to send, receive, and process electronic (i.e., electrical) and/or optical signals. The control center 180 may be operable to control one or more portions of the wellsite system 100, such as the wellsite equipment and the tool string 110, via the electronic and/or optical signals transmitted by the control center 180. The control center 180 may comprise an electrical power source operable to supply electrical power to components of the wellsite system 100, including the tool string 110. The electronic signals, the optical signals, and the electrical power may be transmitted between the control center 180 and the tool string 110 via conduits 184, 186 extending between the control center 180 and the tool string 110. The conduits 184, 186 may each comprise one or more electrical conductors, such as electrical wires, lines, or cables, which may transmit electrical power, electronic downlink signals, and/or other electrical control signals from the control center 180 to the tool string 110, as well as electronic uplink signals, and/or other electrical feedback signals from the tool string 110 to the control center 180. The conduits 184, 186 may each further comprise one or more optical conductors or paths, such as fiber optic cables, which may transmit optical downlink signals and/or other optical control signals from the control center 180 and the tool string 110, as well as optical uplink signals and/or other optical feedback signals from the tool string 110 to the control center 180. Furthermore, both the control center 180 and one or more portions of the tool string 110 may be operable to multiplex and demultiplex optical downlink and uplink signals. Accordingly, the control center 180 and the one or more portions of the tool string 110 may be operable to communicate both the optical downlink and uplink signals via a single optical conductor or path.

The conduits 184, 186 may collectively comprise a plurality of conduits or conduit portions interconnected in series and/or in parallel and extending between the control center 180 and the tool string 110. For example, as depicted in the example implementation of FIG. 1, the conduit 184 extends between the control center 180 and a reel 160 of coiled tubing 162, such that the conduit 184 may remain substantially stationary with respect to the wellsite surface 105. The conduit 186 extends between the reel 160 and the tool string 110 via the coiled tubing 162, including the coiled tubing 162 spooled on the reel 160. Thus, the conduit 186 may rotate and otherwise move with respect to the wellsite surface 105. The reel 160 may be rotatably supported on the wellsite surface 105 by a stationary base 164, such that the reel 160 may be rotated to advance and retract the coiled tubing 162 within the wellbore 120. The conduit 186 may be contained within an internal passage of the coiled tubing 162, secured externally to the coiled tubing 162, or embedded within the structure of the coiled tubing 162. A rotary joint 150, such as may be known in the art as a collector, may provide an interface between the stationary conduit 184 and the moving conduit 186. However, the stationary conduit 184 may be omitted and communication between the control center 180 and the tool string 110 may be achieved via a wireless data transmission and acquisition equipment (not shown) located within and movable with the reel 160. Such equipment may be communicatively connected with the control center 180 via wireless communication and with the tool string 110 via the optical and/or electrical conductors or paths within the moving conduit 186.

The wellsite system 100 may further comprise a fluid source 140 from which fluid may be conveyed by a fluid conduit 142 to the reel 160 of coiled tubing 162. The fluid conduit 142 may be fluidly connected to the coiled tubing 162 by a swivel or other rotating coupling (obstructed from view in FIG. 1). The coiled tubing 162 may be utilized to convey the fluid received from the fluid source 140 to the tool string 110 coupled at the downhole end of the coiled tubing 162 within the wellbore 120.

The wellsite system 100 may further comprise a support structure 170, such as may include or otherwise support a coiled tubing injector 171 and/or other apparatus operable to facilitate movement of the coiled tubing 162 in the wellbore 120. Other support structures may be also included, such as a derrick, a crane, a mast, a tripod, and/or other structures. A diverter 172, a blow-out preventer (BOP) 173, and/or a fluid handling system 174 may also be included as part of the wellsite system 100. For example, during deployment, the coiled tubing 162 may be passed from the injector 171, through the diverter 172 and the BOP 173, and into the wellbore 120. The tool string 110 may be conveyed along the wellbore 120 via the coiled tubing 162 in conjunction with the coiled tubing injector 171, such as may be operable to apply an adjustable uphole and downhole force to the coiled tubing 162 to advance and retract the tool string 110 within the wellbore 120.

During some downhole operations, fluid may be conveyed through the coiled tubing 162 and may exit into the wellbore 120 adjacent to the tool string 110. For example, the fluid may be directed into an annular area between the sidewall of the wellbore 120 and the tool string 110 through one or more ports (not shown) in the coiled tubing 162 and/or the tool string 110. Thereafter, the fluid may flow in the uphole direction and out of the wellbore 120. The diverter 172 may direct the returning fluid to the fluid handling system 174 through one or more conduits 176. The fluid handling system 174 may be operable to clean the fluid and/or prevent the fluid from escaping into the environment. The fluid may then be returned to the fluid source 140 or otherwise contained for later use, treatment, and/or disposal.

The tool string 110 may be or comprise a single or multiple subs, modules, and/or tools, hereafter collectively referred to as downhole tools 112. For example, the tool string 110 and/or one or more of the tools 112 may be or comprise at least a portion of a monitoring tool, an acoustic tool, a density tool, a drilling tool, an electromagnetic (EM) tool, a formation testing tool, a fluid sampling tool, a formation logging tool, a formation measurement tool, a gravity tool, a magnetic resonance tool, a neutron tool, a nuclear tool, a photoelectric factor tool, a porosity tool, a reservoir characterization tool, a resistivity tool, a shuttle or another seismic tool, a surveying tool, and/or a tough logging condition (TLC) tool, among other examples within the scope of the present disclosure.

One or more of the downhole tools 112 may be or comprise a downhole telemetry tool 113, such as may facilitate communication between the tool string 110 and the control center 180 at the wellsite surface 105. The telemetry tool 113 may be operable to facilitate communication between the tool string 110 and the control center 180 via optical means, as described below.

One or more of the downhole tools 112 may be or comprise a casing collar locator (CCL) operable to detect ends of casing collars by sensing a magnetic irregularity caused by a relatively high mass of an end of a collar of the casing 122. One or more of the tools 112 may also or instead be or comprise a gamma ray (GR) tool that may be utilized for depth correlation. The CCL and/or GR tools may generate and transmit electronic and/or optical signals in real-time to wellsite surface equipment, such as the control center 180, via the conduits 184, 186. The CCL and/or GR tool signals may be utilized to determine the position of the tool string 110, such as with respect to known casing collar numbers and/or positions within the wellbore 120. Therefore, the CCL and/or GR tools may be utilized to detect and/or log the location of the tool string 110 within the wellbore 120 during intervention or other downhole operations.

One or more of the downhole tools 112 may also be or comprise a downhole power module, such as may comprise a battery pack and/or other means of storing electrical energy downhole for use by the other downhole tools 112. Because the electrical energy may be stored in and supplied by the power module, the conduits 184, 186 may comprise the one or more optical conductors or paths, but not the electrical conductors. In such implementations, communication between the control center 180 or other surface equipment and the tool string 110 may be just via the one or more optical conductors or paths of the conduits 184, 186.

One or more of the downhole tools 112 and the telemetry tool 113 may comprise one or more sensors 114 operable to generate sensor output data representative of a sensed parameter. The sensor output data may be generated in electrical form and stored downhole and/or communicated in real-time to the wellsite surface 105 in electrical and/or optical form via one or more of the electrical and/or optical conductors of the conduits 184, 186. The sensors 114 may include inclination and/or other orientation sensors, such as accelerometers, magnetometers, gyroscopic sensors, and/or other sensors for utilization in determining the orientation of the tool string 110 relative to the wellbore 120. The sensors 114 may also or instead include sensors for utilization in determining petrophysical and/or geophysical parameters of a portion of the formation 130 along the wellbore 120, such as for measuring and/or detecting one or more of pressure, temperature, strain, composition, and/or electrical resistivity, among other examples within the scope of the present disclosure. The sensors 114 may also or instead include a borehole televiewer or other sonic sensors, such as acoustic transducers and receivers utilized for borehole and/or formation evaluation. The sensors 114 may also or instead include downhole video cameras, such as for capturing video and/or images of the wellbore environment. The sensors 114 may also or instead include fluid sensors for detecting the presence of fluid, a certain fluid, or a type of fluid within the tool string 110 or the wellbore 120. The sensors 114 may also or instead include fluid sensors for utilization in measuring properties and/or determining composition of fluid sampled from the wellbore 120 and/or the formation 130, such as spectrometers, fluorescence sensors, optical fluid analyzers, density sensors, viscosity sensors, pressure sensors, and/or temperature sensors, among other examples within the scope of the present disclosure.

Each of the downhole tools 112 and the telemetry tools 113 may include a processing system 116 comprising a processor and memory collectively operable to process the electronic downlink signals and generate electronic uplink signals. The processing system 116 may be further operable to receive the sensor output data generated by the sensor 114 and generate the electronic uplink signals based on the sensor output data.

Each of the downhole tools 112 and the telemetry tools 113 may comprise one or more IOMs 118 operable to receive and transmit optical signals. For example, the IOM 118 associated with the telemetry tool 113 may be operable to receive the optical downlink signals transmitted from the wellsite surface 105 by the control center 180 and convert the optical downlink signals to electronic downlink signals. The IOM 118 associated with the telemetry tool 113 may be further operable to receive the electronic uplink signals generated by the processing system 116, convert the electronic uplink signals to the optical uplink signals, and transmit the optical uplink signals to the control center 180. Furthermore, the IOM 118 associated with a corresponding downhole tool 112 may be operable to transmit and/or receive the optical uplink and/or downlink signals to and/or from an IOM 118 associated with another downhole tool 112. Furthermore, each IOM 118 may be able to demultiplex received multiplexed optical uplink or downlink signals and multiplex demultiplexed optical uplink or downlink signals that are being transmitted, such as may permit optical communication via a single optical conductor or path between the tool string 110 and the control center 180 and/or between two or more tools 112, 113.

Figure 2:
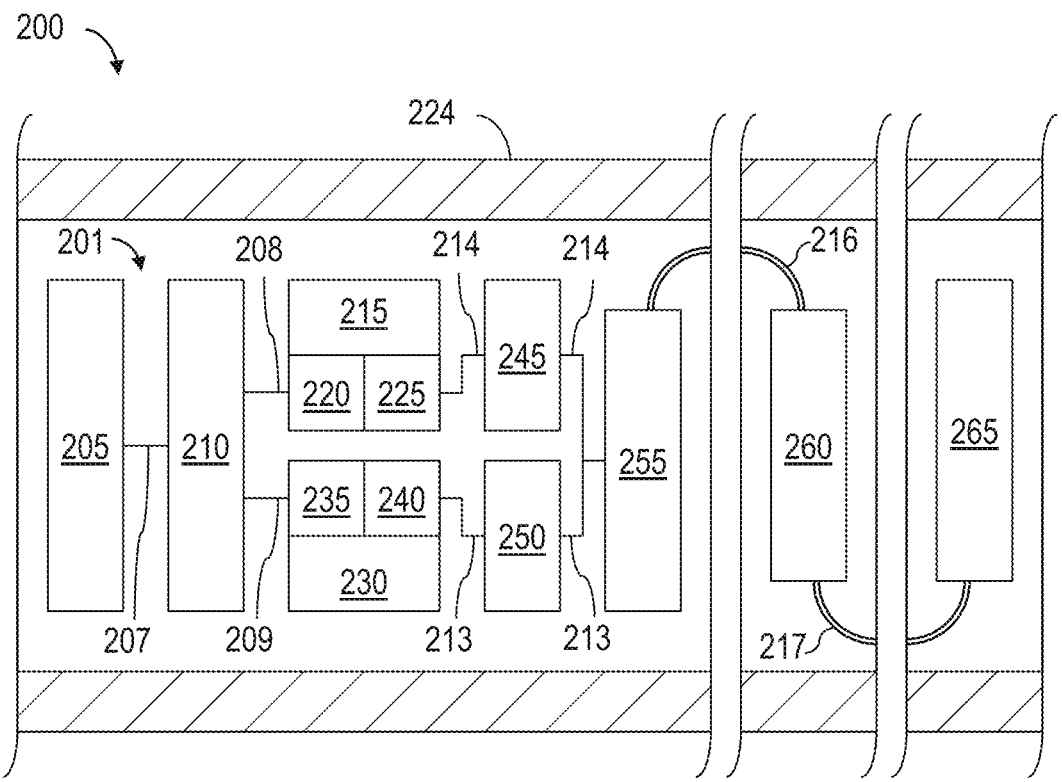
FIG. 2 is a schematic view of at least a portion of an example implementation of apparatus according to one or more aspects of the present disclosure.
Figure 3:
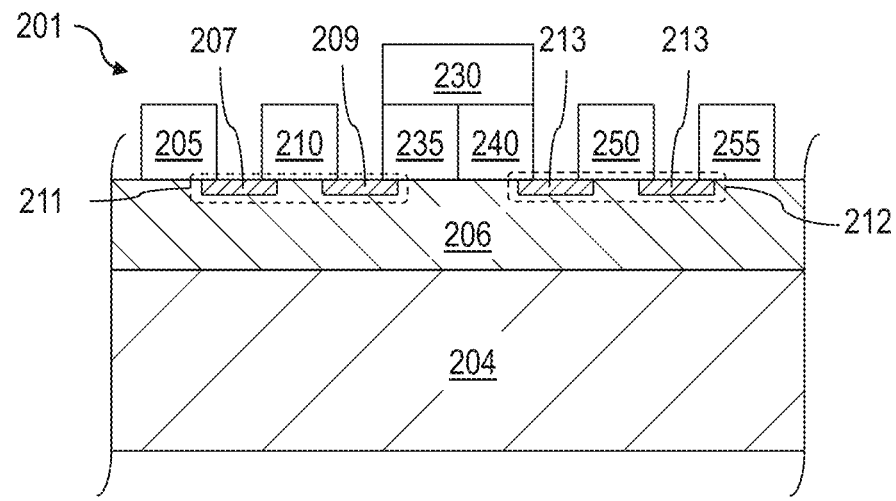
FIG. 3 is a schematic sectional view of the apparatus shown in FIG. 2.

FIGS. 2 and 3 are schematic top and sectional views of at least a portion of an example implementation of the downhole and telemetry tools 112, 113 shown in FIG. 1, designated in FIGS. 2 and 3 by reference numeral 200. The following description refers to FIGS. 1, 2, and 3, collectively.

The downhole tool 200 may include an IOM 201 comprising a plurality of components each attached to a frame 204 secured within a housing 224 of the downhole tool 200. The frame 204 may be, comprise, or carry a printed circuit board (PCB) 206. The IOM 201 may be able to receive the multiplexed optical downlink or incoming signals originating from the control center 180 or other surface equipment and transmit the multiplexed optical uplink or outgoing signals toward the control center 180 or other surface equipment. The IOM 201 may also be able to receive the multiplexed optical downlink or uplink signals originating from another one of the downhole tools 200 and transmit the multiplexed optical downlink or uplink signals to another of the downhole tools 200.

The IOM 201 may comprise an optical interface 205 optically connectable with an optical conductor or path of the conduit 186 or another optical conductor in optical communication with another downhole tool 200. Accordingly, the optical interface 205 may be able to receive the multiplexed optical downlink or uplink signals from the surface equipment or another downhole tool 200 and to transmit the multiplexed optical uplink or downlink signals to the surface equipment or another downhole tool 200. The optical interface 205 may be or comprise an optical connector that may detachably connect with a corresponding optical connector to physically and optically couple the IOM 201 with the optical conductor or path extending to the wellsite surface 105 or to another downhole tool. The corresponding optical connectors may be or comprise mechanical connectors, such as push and twist connectors, threaded connectors, and/or other types of connectors and/or interfaces, including those which may aid in aligning corresponding optical leads of the corresponding connectors, sealing the connected leads, and/or establishing an affirmative physical connection. For example, the corresponding optical connectors may be or comprise, for example, LC, ST, and/or other industry standard connectors. The corresponding connectors may also be or comprise pigtail connectors, such as may be spliced or otherwise connected together to establish the optical connection.

The IOM 201 may further comprise a wavelength-division multiplexer/demultiplexer (WDM) 210 able to demultiplex the multiplexed optical downlink signals into carrier optical downlink signals, and to multiplex carrier optical uplink signals generated by the downhole tool 200 into the multiplexed optical uplink signals. The WDM 210 may utilize, for example, wavelength-division multiplexing technology, to multiplex multiple optical signals communicated along multiple optical conductors or paths for communication along a single optical conductor or path, and to demultiplex optical signals communicated along a single optical conductor or path for communication along multiple optical conductors or paths.

The IOM 201 may also comprise a receiver 215 and a transmitter 230, collectively operable to perform electrical/optical conversion operations. The receiver 215 may be in communication with the WDM 210 and able to convert the carrier optical downlink signals received from the WDM 210 into electronic incoming or downlink signals while the transmitter 230 may be in communication with the WDM 210 and able to convert electronic outgoing or uplink signals generated by the downhole tool 200 to the carrier optical uplink signals.

The optical interface 205 may be in optical communication with the receiver 215 and transmitter 230 via an optical circuitry 211 able to communicate optical signals. The optical circuitry 211 may comprise an optical conductor or path 207 able to communicate the multiplexed optical downlink and uplink signals between the optical interface 205 and the WDM 210. The optical circuitry 211 may further comprise an optical conductor or path 208 able to communicate the carrier optical downlink signals from the WDM 210 to the receiver 215 and an optical conductor or path 209 able to communicate the carrier optical uplink signals from the transmitter 230 to the WDM 210. The optical conductors or paths 207, 208, 209 may be or comprise optical fibers, cavities, and/or other optical conductors or paths extending through the PCB 206, along a surface of the PCB 206, or otherwise externally from the PCB 206 between the optical interface 205 and the receiver 215 and transmitter 250. The WDM 210 may facilitate optical communication between the optical interface 205 and the WDM 210 via not more than one optical conductor or path 207 and optical communication between the WDM 210 and the receiver 215 and transmitter 230 via two or more optical conductors or paths 208, 209. Accordingly, the optical communication between the optical interface 205 and the control center 180 or between the optical interface 205 and another downhole tool 200 may be via not more than one optical conductor or path of the conduits 184, 186.

The receiver 215 may comprise a receiver device 220 able to generate downlink output signals representative of the carrier optical downlink signals and a receiver circuit 225 able to convert the downlink output signals into the electronic downlink signals. In an example implementation, the receiver device 220 may comprises a photodiode. The transmitter 230 may comprise a transmitter circuit 240 able to convert the electronic uplink signals into uplink output signals and a transmitter device 235 able to convert the uplink output signals into the carrier optical uplink signals. In an example implementation, the transmitter device may comprise a laser diode and/or a light-emitting diode.

The downhole tool 200 may further comprise a sensor 265 operable to generate or output sensor output data representative of a sensed parameter. The sensor output data may be generated in electrical form. The sensor 265 may be or comprise one or more of the sensors 114 described above.

The downhole tool 200 may also comprise a processing system 260 comprising a processor (not shown) and a memory (not shown) collectively operable to process the electronic downlink signals and generate the electronic uplink signals. The processing system 260 may be further operable to receive the sensor output data from the sensor 265 and generate the electronic uplink signals based on the received sensor output data. The processing system 260 may be secured within the housing 224 of the downhole tool 200.

Each of the receiver 215 and transmitter 230 may be in electrical communication with the processing system 260 via an electrical interface 255 of the IOM 201. The electrical interface 255 may be able to receive the electronic downlink signals from the receiver 215 and transmit the electronic downlink signals to the processing system 260. The electrical interface 255 may be further able to receive the electronic uplink signals from the processing system 260 and transmit the electronic uplink signals to the transmitter 230. The electrical interface 205 may be or comprise a connector that may detachably connect with a corresponding connector terminating an electrical conductor or path 216 to electrically connect the IOM 201 with the processing system 260. The corresponding connectors may be or comprise mechanical connectors, such as multi-pin connectors, push and twist connectors, threaded connectors, and/or other types of connectors and/or interfaces, including those which may aid in aligning corresponding electrical leads of the corresponding connectors, sealing the connected leads, and/or establishing an affirmative physical connection. The corresponding connectors may be or comprise pigtail connectors, such as may be spliced or otherwise connected together to establish the electrical connection.

The receiver 215 may be in communication with a receiver buffer 245 of the IOM 201 able to buffer the electronic downlink signals generated by the receiver 215 while the transmitter 230 may be in communication with a transmitter buffer 250 of the IOM 201 able to buffer the electronic uplink signals generated by the processing system 260. The receiver buffer 245 may be communicatively located between the receiver 215 and the electrical interface 255 while the transmitter buffer 250 may be communicatively located between the transmitter 230 and the electrical interface 255.

The processing system 260 may be in electrical communication with the receiver 215 and transmitter 230 via electrical circuitry 212 able to communicate the electronic downlink signals and the electronic uplink signals to and from, respectively, the processing system 260. The electrical circuitry 212 may comprise an electrical conductor or path 214 extending between the receiver 215 and the electrical interface 255, and able to communicate the electronic downlink signals from the receiver 215 to the receiver buffer 245 and from the receiver buffer 245 to the electrical interface 255. The electrical circuitry 212 may further comprise an electrical conductor or path 213 extending between the transmitter 230 and the electrical interface 255, and able to communicate the electronic uplink signals from the electrical interface 255 to the transmitter buffer 250 and from the transmitter buffer 250 to the transmitter 230. In an example implementation, the electrical conductors or paths 213, 214 of the electrical circuitry 212 may be or comprise electrical traces or other electrical conductors extending through the PCB 206, along a surface of the PCB 206, or otherwise between the electrical interface 255 and the receiver 215 and transmitter 230. The electrical circuitry 212 may further comprise the electrical conductor or path 216 extending between the electrical interface 255 and the processing system 260 and able to communicate the electronic uplink and downlink signals between the electrical interface 255 and the processing system 260. The processing system 260 may also be in communication with the sensor 265. Hence, the electrical circuitry 212 may further comprise the electrical conductor or path 217 extending between the processing system 260 and the sensor 265 and able to communicate the sensor output data to the processing system 260. In an example implementation, one or more of the electrical conductors or paths 216, 217 may comprise an electrical cable.

Figure 4:
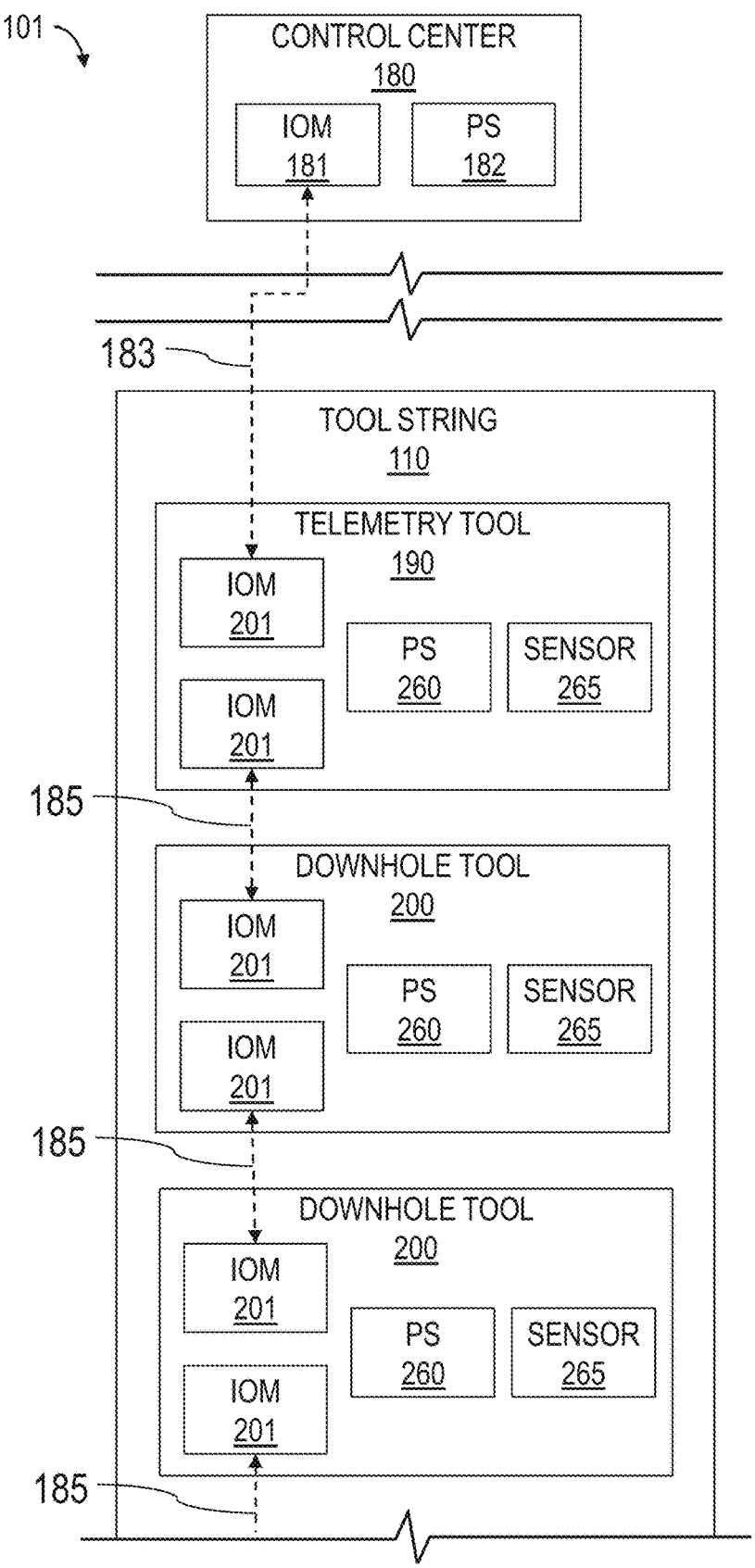
FIG. 4 is a schematic view of at least a portion of an example implementation of apparatus according to one or more aspects of the present disclosure.

FIG. 4 is a schematic view of an example implementation of a wellsite system 101 according to one or more aspects of the present disclosure. The wellsite system 101 comprises one or more similar features of the wellsite system 100 collectively shown in FIGS. 1-3, including where indicated by like reference numbers, except as described below. The following description refers to FIGS. 1-4, collectively.

The wellsite system 101 may include a control center 180 comprising a processing system 182 having a processor (not shown) and a memory (not shown) collectively operable to process the electronic uplink signals and generate the electronic downlink signals. The control center 180 may further include an IOM 181 comprising a receiver, such as the receiver 215, and a transmitter, such as the transmitter 230, in communication with the processing system 182 and collectively operable to perform electrical/optical conversion operations. The control center 180 may further comprise a WDM, such as the WDM 210, able to demultiplex received multiplexed optical uplink signals and communicate the demultiplexed optical uplink signals to the receiver and multiplex demultiplexed optical downlink signals that are being generated by the transmitter 230 for transmission to the tool string 110. The IOM 181 and the processing system 182 may comprise the same or similar structure and/or mode of operation as the IOM 201 and the processing system 260, respectively.

The wellsite system 101 may further include a tool string 110 comprising a telemetry tool 190 and a plurality of downhole tools 200, whereby each of the tools 190, 200 comprises two substantially identical IOMs 201 communicatively connected with a processing system 260. Each IOM 201 may be optically connected with the control center 180 or with an IOM 201 of another downhole tool 200. Although designated with a different numeral, the telemetry tool 190 may be or comprise a downhole tool 200 designated or otherwise operable for communication with the control center 180.

The two IOMs 201 associated with each of the tools 190, 200 may facilitate optical communication of the sensor output data and other information generated by the tools 190, 200 from the tool string 110 to the control center 180 via a single optical conductor or path 183 of the conduits 184, 186, and optical communication of the sensor output data and other information to and from another of the tools 190, 200 of the tool string 110 via a single optical conductor or path 185. For example, the processing system 260 and the IOM 201 of each individual one of the downhole tools 190, 200 may be collectively able to transmit, to the IOM 201 of a different one of the downhole tools 190, 200, the multiplexed optical downlink signals originating from the control center 180 or other surface equipment. The processing system 260 and the IOM 118 of each individual one of the tools 190, 200 may be further collectively able to receive additional multiplexed optical uplink signals from the IOM 201 of the different one of the downhole tools 190, 200, and transmit the additional multiplexed optical uplink signals toward the surface equipment, such as the control center 180. Such configuration may permit the control center 180 to communicate with the tool string 110 via a single optical conductor or path 183 of the conduits 184, 186, and permit the plurality of the tools 190, 200 to communicate with each other via single optical conductors or paths 185.

During example operations, the multiplexed optical downlink signals originating from the control center 180 or other surface equipment and communicated via the optical conduit or path 183 may be received by an upper IOM 201 of the telemetry tool 190 without passing through upper and lower IOMs 201 of the adjacent downhole tool 200. Thereafter, the multiplexed optical downlink signals originating from the surface equipment may be transmitted to the lower IOM 201 of the telemetry tool 190, then transmitted by the lower IOM 201 of the telemetry tool 190 to the upper IOM 201 of the adjacent downhole tool 200 via the optical conduit or path 185, and then operationally utilized by at least one of the telemetry tool 190 and the adjacent downhole tool 200. Additional multiplexed optical uplink signals may be generated by the adjacent downhole tool 200, transmitted by the upper IOM 201 of the adjacent downhole tool 200 to the lower IOM 201 of the telemetry tool 190 via the optical conduit or path 185, then transmitted to the upper IOM 201 of the telemetry tool 200, and then transmitted by the upper IOM 201 of the telemetry tool 190 toward the surface equipment via the optical conduit or path 183.

Figure 5:
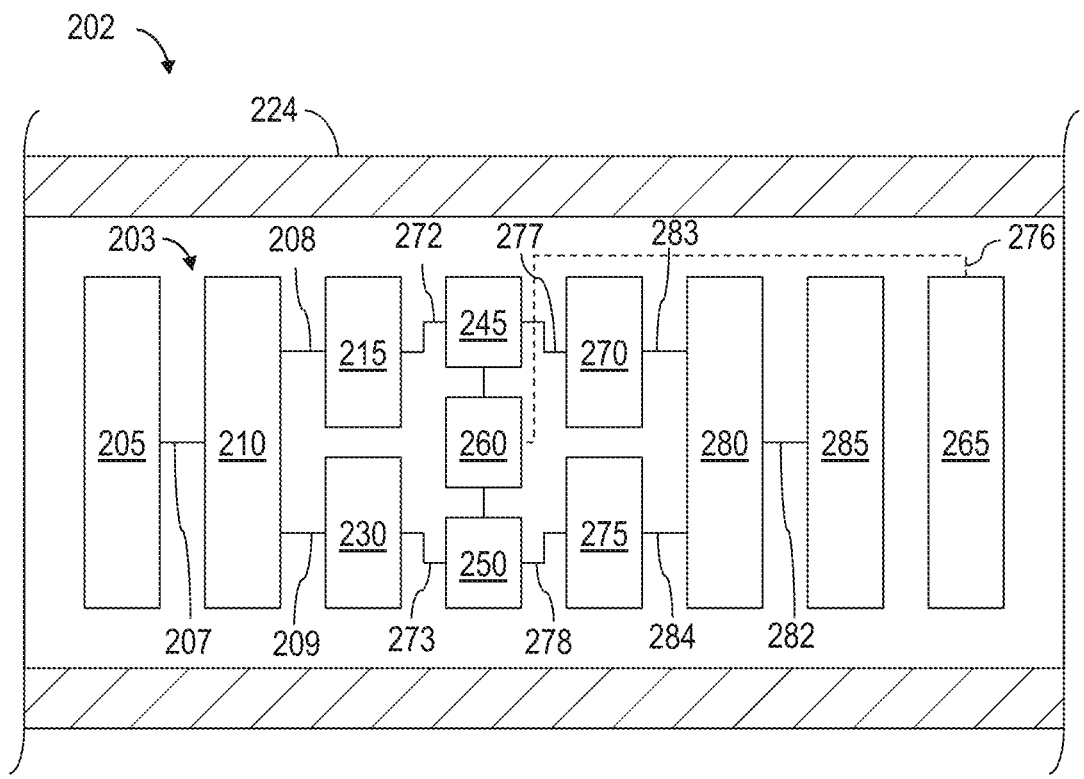
FIG. 5 is a schematic view of at least a portion of an example implementation of apparatus according to one or more aspects of the present disclosure.
Figure 6:
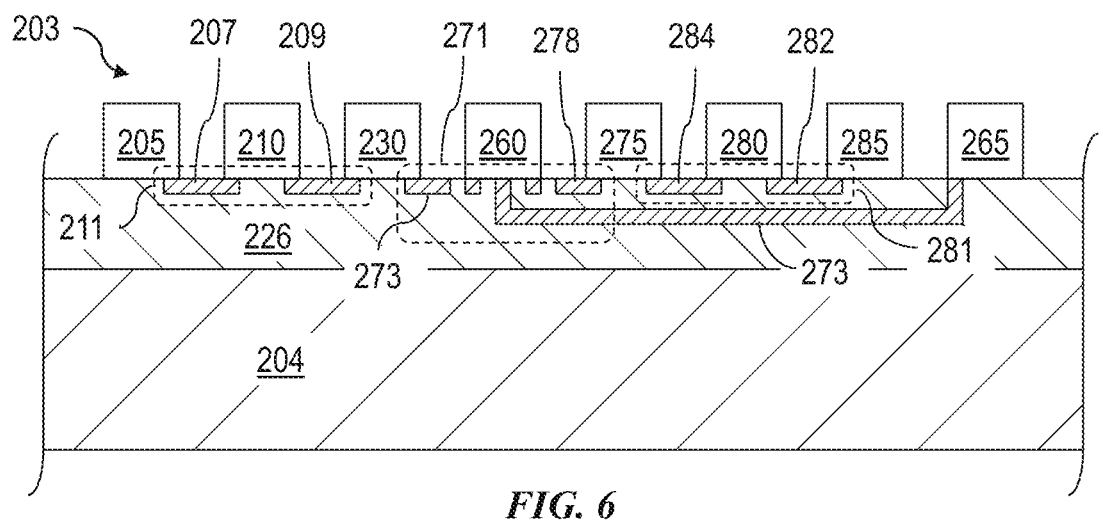
FIG. 6 is a schematic sectional view of the apparatus shown in FIG. 5.

FIGS. 5 and 6 are schematic top and sectional views of at least a portion of an example implementation of the downhole and telemetry tools 112, 113 shown in FIG. 1, designated in FIGS. 5 and 6 by reference numeral 202. The downhole tool 202 comprises one or more similar features of the downhole tool 200 shown in FIGS. 2 and 3, including where indicated by like reference numbers, except as described below. The following description refers to FIGS. 1-6, collectively.

The downhole tool 202 may include an IOM 203 comprising a plurality of components each attached to a frame 204 secured within a housing 224 of the downhole tool 202. The frame 204 may be, comprise, or carry a PCB 226. Similarly to the IOM 201, the IOM 203 may comprise an optical interface 205 optically connectable with an optical conductor or path of the conduit 186, to facilitate optical communication with the control center 180, or with an optical conductor 185, to facilitate communication with another downhole tool 202.

The IOM 203 may further comprise a WDM 210 able to demultiplex the multiplexed optical downlink signals generated by the control center 180 into carrier optical downlink signals, and to multiplex carrier optical uplink signals generated by a transmitter 230 into the multiplexed optical uplink signals. The IOM 203 may also comprise a processing system 260 operable to process the electronic downlink signals generated by a receiver 215 and generate the electronic downlink signals. The receiver 215 and the transmitter 230 may be communicatively connected between the WDM 210 and the processing system 260 and collectively operable to perform electrical/optical conversion operations, such as may permit the WDM 210 and the processing system 260 to communicate. Although not shown in FIGS. 5 and 6, the receiver 215 may comprise a receiver device, such as the receiver device 220, and a receiver circuit, such as the receiver circuit 225, while the transmitter 230 may comprise a transmitter circuit, such as the transmitter circuit 240, and a transmitter device, such as the transmitter device 235. The optical interface 205 may be in optical communication with the receiver 215 and transmitter 230 via an optical circuitry 211 comprising optical conductors or paths 207, 208, 209 able to communicate optical signals.

The IOM 203 may further comprise a receiver buffer 245 able to buffer the electronic downlink signals generated by the receiver 215, and a transmitter buffer 250 able to buffer the electronic uplink signals generated by the processing system 260. The receiver buffer 245 may be communicatively located between the receiver 215 and the processing system 260 while the transmitter buffer 250 may be communicatively located between the transmitter 230 and the processing system 260.

The processing system 260 may be in electrical communication with the receiver 215 and transmitter 230 via electrical circuitry 271 able to communicate the electronic downlink signals and the electronic uplink signals to and from, respectively, the processing system 260. The electrical circuitry 271 may comprise an electrical conductor or path 272 extending between the receiver 215 and the processing system 260. The electrical circuitry 271 may further comprise an electrical conductor or path 273 extending between the transmitter 230 and the processing system 260. In an example implementation, the electrical conductors or paths 272, 273 of the electrical circuitry 271 may be or comprise electrical traces or other electrical conductors extending through the PCB 226, along a surface of the PCB 226, or otherwise between the processing system 260 and the receiver 215 and transmitter 230. In an example implementation, the processing system 260 may be mechanically and electrically coupled to the PCB 206 or the processing system 260 may be electrically connected with the PCB via an electrical interface and an electrical conductor or path, such as the electrical interface 255 and the conductor or path 216.

The IOM 203 may further comprise an additional plurality of components attached to the frame 204 and/or the PCB 206, such as may permit the IOM 203 to communicate with another downhole tool 202. Accordingly, the IOM 203 may comprise another optical interface 285 optically connectable with an optical conductor or path 185 of a downhole tool 202 that is not connected with the optical interface 205. Hence, the optical interface 285 may be able to receive and transmit the multiplexed optical downlink and uplink signals to and from another downhole tool 202. The optical interface 285 may comprise the same or similar structure and/or mode of operation as the optical interface 205 described above.

The IOM 203 may further comprise a WDM 280 able to demultiplex the multiplexed optical downlink signals into the carrier optical downlink signals, and to multiplex the carrier optical uplink signals generated by the downhole tool 202 into the multiplexed optical uplink signals. The WDM 280 may comprise the same or similar structure and/or mode of operation as the WDM 210 described above.

The IOM 203 may also comprise a receiver 270 and a transmitter 275, collectively operable to perform electrical/optical conversion operations. The receiver 270 may be in communication with the WDM 280 and able to convert the carrier optical downlink signals received from the WDM 280 into electronic downlink signals while the transmitter 275 may be in communication with the WDM 280 and able to convert electronic uplink signals generated by the downhole tool 202 to the carrier optical uplink signals. Although not shown in FIGS. 5 and 6, the receiver 270 may comprise a receiver device, such as the receiver device 220, and a receiver circuit, such as the receiver circuit 225, while the transmitter 275 may comprise a transmitter circuit, such as the transmitter circuit 240, and a transmitter device, such as the transmitter device 235. The receiver 270 and the transmitter 275 may comprise the same or similar structure and/or mode of operation as the receiver 215 and the transmitter 230 described above.

The optical interface 285 may be in optical communication with the receiver 270 and transmitter 275 via an optical circuitry 281 able to communicate optical signals. The optical circuitry 281 may comprise an optical conductor or path 282 able to communicate the multiplexed optical downlink and uplink signals between the optical interface 285 and the WDM 280. The optical circuitry 281 may further comprise an optical conductor or path 283 able to communicate the carrier optical downlink signals from the WDM 280 to the receiver 270 and an optical conductor or path 284 able to communicate the carrier optical uplink signals from the transmitter 275 to the WDM 280. The optical conductors or paths 282, 283, 284 may be or comprise optical fibers or other optical conductors able to communicate optical signals extending through the PCB 206, along a surface of the PCB 206, or otherwise between the optical interface 285 and the receiver 270 and transmitter 275. The WDM 280 may facilitate optical communication between the optical interface 285 and the WDM 280 via not more than one optical conductor or path 282 and optical communication between the WDM 280 and the receiver 270 and transmitter 275 via two or more optical conductors or paths 283, 284. Accordingly, the optical communication between the optical interface 285 and another downhole tool 202 may be via not more than one optical conductor or path 185.

The downhole tool 202 may further comprise a sensor 265 operable to generate or output sensor output data representative of a sensed parameter. The sensor output data may be generated in electrical form. The sensor 265 may be or comprise one or more of the sensors 114 described above. The sensor 265 may be in communication with the processing system 260 via an electrical conductor or path 276. Accordingly, the processing system 260 may be further operable to receive the sensor output data from the sensor 265 and generate the electronic uplink signals based on the received sensor output data.

The receiver 270 may be in communication with the receiver buffer 245 able to buffer the electronic downlink signals generated by the receiver 270 while the transmitter 275 may be in communication with the transmitter buffer 250 able to buffer the electronic uplink signals generated by the processing system 260. The receiver buffer 245 may be communicatively located between the receiver 270 and the processing system 260 while the transmitter buffer 250 may be communicatively located between the transmitter 275 and the processing system 260.

The processing system 260 may be in electrical communication with the receiver 270 and transmitter 275 via the electrical circuitry 271 able to communicate the electronic downlink signals and the electronic uplink signals to and from, respectively, the processing system 260. The electrical circuitry 271 may further comprise an electrical conductor or path 277 extending between the receiver 270 and the processing system 260. The electrical circuitry 271 may further comprise an electrical conductor or path 278 extending between the transmitter 275 and the processing system 260. The electrical circuitry 271 may further comprise an electrical conductor or path 276 extending between the processing system 260 and the sensor 265. In an example implementation, the electrical conductors or paths 276, 277, 278 of the electrical circuitry 271 may be or comprise electrical traces or other electrical conductors extending through the PCB 226, along a surface of the PCB 226, or otherwise between the processing system 260 and the receiver 215 and transmitter 230.

Figure 7:
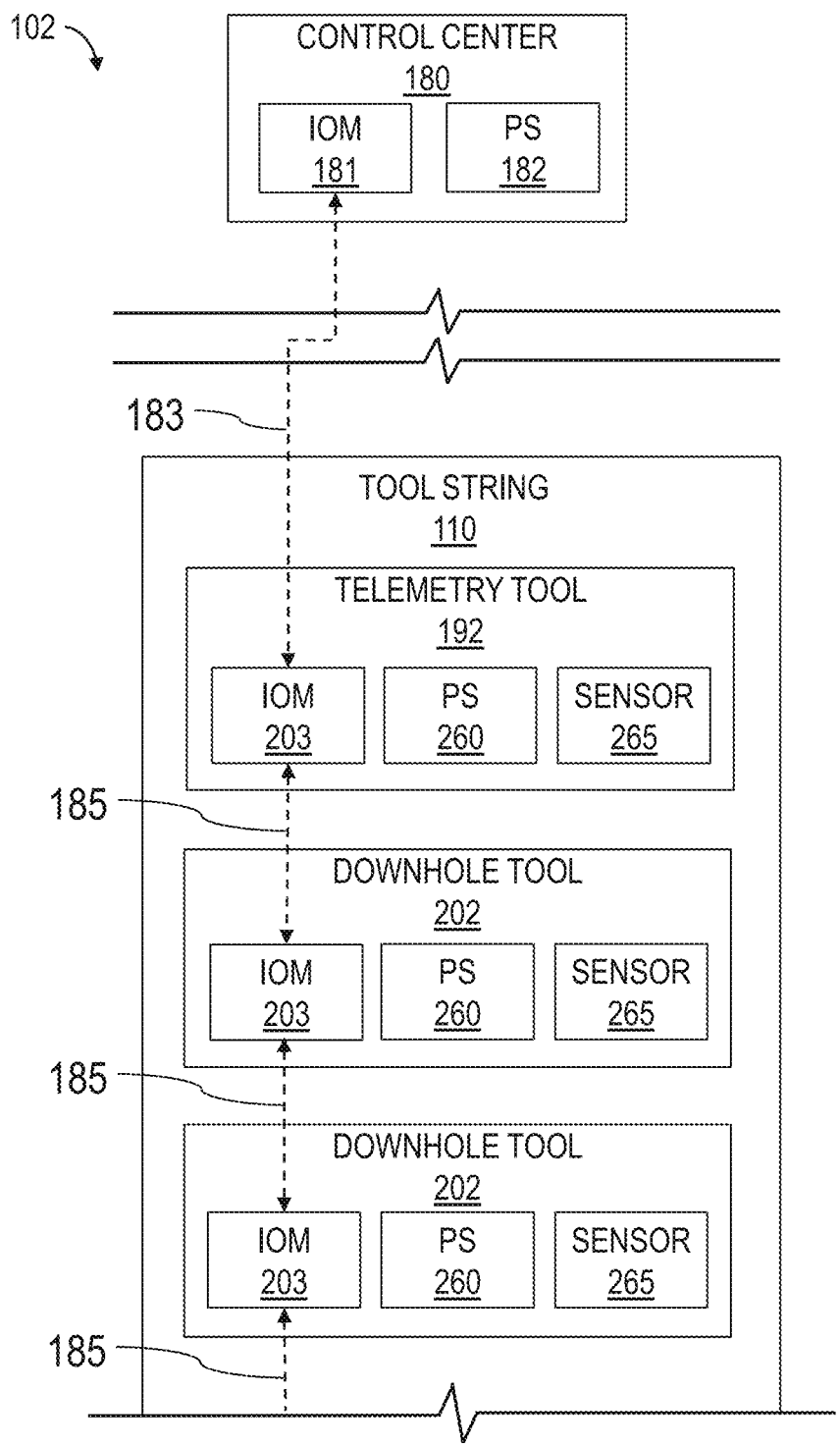
FIG. 7 is a schematic view of at least a portion of an example implementation of apparatus according to one or more aspects of the present disclosure.

FIG. 7 is a schematic view of an example implementation of the wellsite system 102 according to one or more aspects of the present disclosure. The wellsite system 102 comprises one or more similar features of the wellsite systems 100, 101 shown in FIGS. 1 and 4-6, including where indicated by like reference numbers, except as described below. The following description refers to FIGS. 1 and 4-7, collectively.

The wellsite system 102 may include a control center 180 comprising a processing system 182 and IOM 181 described above. The wellsite system 102 may further comprise a tool string 110 comprising a telemetry tool 192 and a plurality of downhole tools 202, whereby each of the tools 192, 202 comprises a single IOM 203 communicatively connected with a corresponding processing system 260 and with two devices, which may include the control center 180, the telemetry tool 192, and the downhole tool 202. Although designated with a different numeral, the telemetry tool 192 may be or comprise the downhole tool 202 designated or otherwise operable for communication with the control center 180.

Each IOM 203 associated with each of the tools 192, 202 may be substantially identical and may facilitate optical communication of the sensor output data and other information generated by the tools 192, 202 between the tool string 110 and the control center 180 via a single optical conductor or path 183 of the conduits 184, 186. Each IOM 203 associated with each of the tools 192, 202 may also facilitate optical communication of the sensor output data and other information to and from another of the tools 192, 202 of the tool string 110 via single optical conductors or paths 185 extending between each tool 192, 202.

For example, the multiplexed optical downlink signals originating from the control center 180 or other surface equipment and communicated via the optical conduit or path 183 may be received by the optical interface 205 of the telemetry tool 192 without passing through the optical interfaces 205, 285 of the adjacent downhole tool 202. Thereafter, the multiplexed optical downlink signals may be transmitted by the optical interface 285 of the telemetry tool 192 via the optical conduit or path 185 to the optical interface 205 of the adjacent downhole tool 202 and operationally utilized by at least one of the telemetry tool 192 and the downhole tool 202.

Furthermore, the adjacent downhole tool 202 may be operable to generate additional multiplexed optical uplink signals, then transmit the additional multiplexed optical uplink signals by the optical interface 205 of the downhole tool 202 via the optical conduit or path 185 to the optical interface 285 of the telemetry tool 192, and then transmit the additional multiplexed optical uplink signals by the optical interface 205 of the telemetry tool 192 toward the control center 180 or other surface equipment via the optical conduit or path 183.

Figure 8:
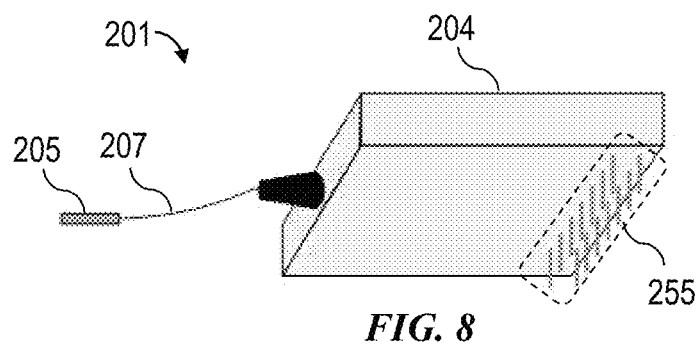
FIG. 8 is a perspective view of at least a portion of an example implementation of the apparatus shown in FIGS. 2-4 according to one or more aspects of the present disclosure.
Figure 9:
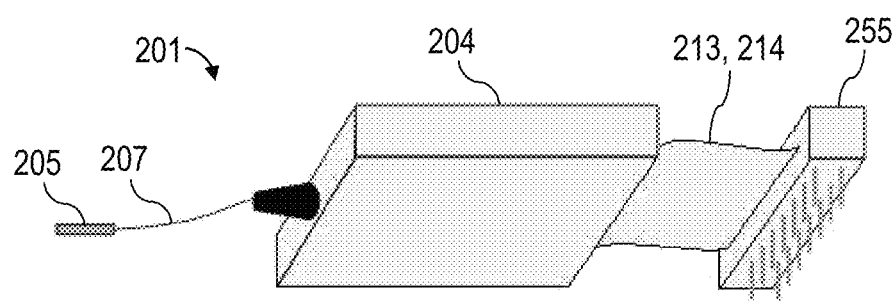
FIG. 9 is a perspective view of at least a portion of an example implementation of the apparatus shown in FIGS. 2-4 according to one or more aspects of the present disclosure.

FIGS. 8 and 9 are perspective views of example implementation of the IOM 201 shown in FIGS. 2-4 according to one or more aspects of the present disclosure. The following description refers to FIGS. 2-4 and 8, collectively.

As shown in FIG. 8, the IOM 201 may comprise a housing or frame 204 enclosing the PCB 206 carrying the WDM 210, the receiver 215, the transmitter 230, and the buffers 245, 250. The frame 204 may have a generally cubic or cuboid configuration or other shape configured to enclose the PCB 206. The IOM 201 may also include a portion of a single optical conductor 207 extending through and from the frame 204, with an optical interface 205, such as an optical connector, terminating the optical conductor 207. The optical interface 205 may be optically coupled with the conductor or path 183 of the conduit 186, to optically connect the IOM 201 with the IOM 181 of the control center 180 at the wellsite surface 105 or the optical interface 205 may be optically coupled with the conductor or path 185, to optically connect the IOM 201 with another instance of the IOM 201 of another downhole tool 200. The IOM 201 may also include an electrical interface 255, which may facilitate electrical communication between the IOM 201 and the processing system 260. The electrical interface 255 may include a plurality of electrical pins extending through and from the frame 204, such as to engage a corresponding plurality of receptacles (not shown) of the downhole tool 200 to electrically couple the IOM 201 with the processing system 260. The plurality of pins may further establish a mechanical connection between the IOM 201 and the downhole tool 200. FIG. 9 shows the IOM 201 shown in FIG. 8, however, instead of the electrical interface 255 comprising the plurality of pins extending through and from the frame 204, the IOM 201 includes at least a portion of the conductors 213, 214 comprising a multi-conductor ribbon cable terminating with the electrical interface 255 comprising a multi-pin connector. The multi-pin connector may be operable to engage a corresponding plurality of receptacles (not shown) of the downhole tool 200 to electrically couple the IOM 201 with the processing system 260.

Figure 10:
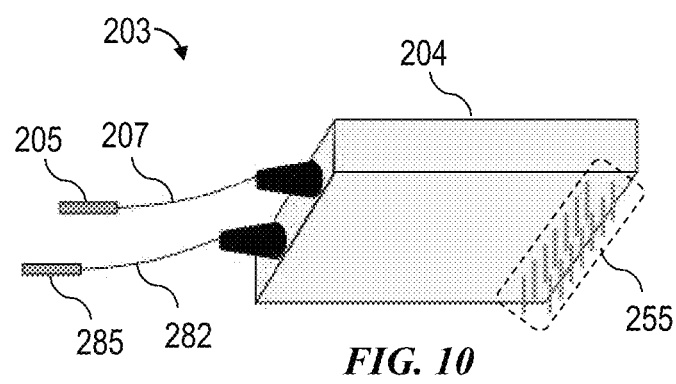
FIG. 10 is a perspective view of at least a portion of an example implementation of the apparatus shown in FIGS. 5-7 according to one or more aspects of the present disclosure.

FIG. 10 is a perspective view of an example implementation of the IOM 203 shown in FIGS. 5-7 according to one or more aspects of the present disclosure. The following description refers to FIGS. 5-7 and 10, collectively.

The IOM 203 may comprise a housing or frame 204 enclosing the PCB 206 carrying the WDMs 210, 280, the receivers 215, 270, the transmitters 230, 275, and the buffers 245, 250. The IOM 203 may also comprise portions of two single optical conductors 207, 282 extending through and from the frame 204 with each optical conductor 207, 282 terminating with a corresponding optical interface 205, 285. Each optical interface 205, 285 may be optically coupled with one of the conductor or path 183 of the conduit 186 and the conductor or path 185. The IOM 203 may also include an electrical interface 255, such as may facilitate electrical communication between the IOM 203 and the processing system 260. The electrical interface 255 may include a plurality of electrical pins extending through and from the frame 204, such as may engage a corresponding plurality of receptacles (not shown) of the downhole tool 202 to electrically couple the IOM 203 with the processing system 260. The plurality of pins may further establish a mechanical connection between the IOM 203 and the downhole tool 202.

Figure 11:
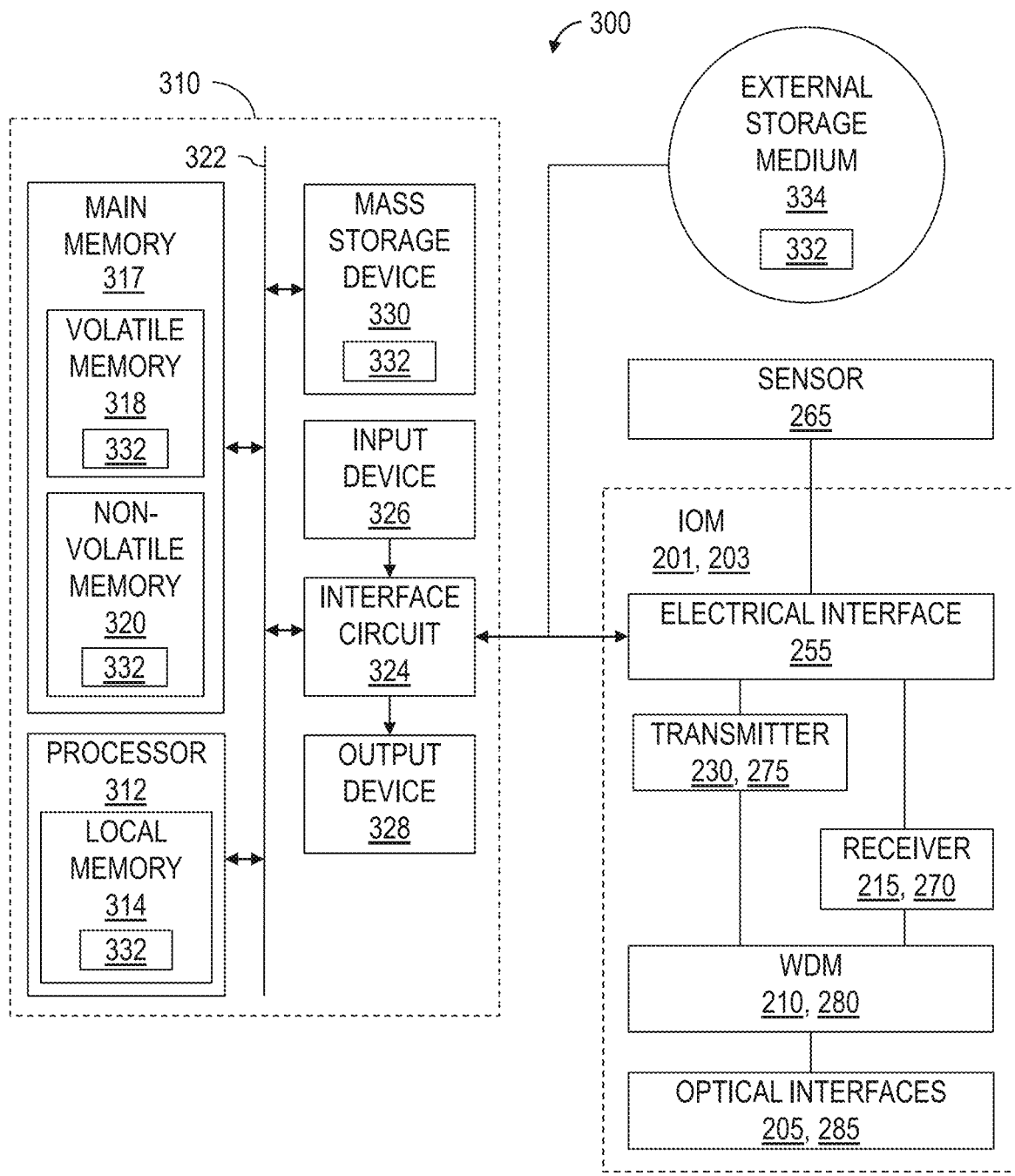
FIG. 11 is a perspective view of at least a portion of an example implementation of apparatus according to one or more aspects of the present disclosure.

Various portions of the apparatus described above and shown in FIGS. 1-10, may collectively form and/or be controlled by a control system, such as may be operable to monitor and/or control at least some operations of the wellsite system 100, 101, 102, including the telemetry tool 190, 192 and the downhole tools 200, 202. FIG. 11 is a schematic view of at least a portion of an example implementation of such a control system 300 according to one or more aspects of the present disclosure. The following description refers to one or more of FIGS. 1-11.

The control system 300 may comprise a controller or processing system 310, which may be in communication with various portions of the wellsite system 100, 101, 102, including the sensors 265, various actuators (not shown) of the downhole tools 200, 202, and/or other portions of downhole tools 200, 202. For clarity, these and other components in communication with the processing system 310 will be collectively referred to hereinafter as "downhole equipment." The processing system 310 may be operable to receive coded instructions 332 from the human operators and the sensor output data generated by the sensors 265, process the coded instructions 332 and the signals, and communicate control signals to the actuators to execute the coded instructions 332 to implement at least a portion of one or more example methods and/or processes described herein, and/or to implement at least a portion of one or more of the example systems described herein. The processing system 310 may be or comprise one or more of the processing systems 182, 260 described above.

The processing system 310 may be or comprise, for example, one or more processors, special-purpose computing devices, servers, personal computers (e.g., desktop, laptop, and/or tablet computers) personal digital assistant (PDA) devices, smartphones, internet appliances, and/or other types of computing devices. The processing system 310 may comprise a processor 312, such as a general-purpose programmable processor. The processor 312 may comprise a local memory 314, and may execute coded instructions 332 present in the local memory 314 and/or another memory device. The processor 312 may execute, among other things, the machine-readable coded instructions 332 and/or other instructions and/or programs to implement the example methods and/or processes described herein. The programs stored in the local memory 314 may include program instructions or computer program code that, when executed by an associated processor, facilitate the wellsite system 100, 101, 102, the downhole tools 190, 192, 200, 202, the IOMs 201, 203, the actuators, and/or the sensors 265 to perform the example methods and/or processes described herein. The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 312 may be in communication with a main memory 317, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing system 310 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 324 may also comprise a graphics driver card. The interface circuit 324 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the downhole equipment may be connected with the processing system 310 via the interface circuit 324, such as may facilitate communication between the downhole equipment and the processing system 310.

One or more input devices 326 may also be connected to the interface circuit 324. The input devices 326 may permit the wellsite operators to enter the coded instructions 332, including control commands, operational set-points, and/or other data for use by the processor 312. The input devices 326 may be, comprise, or be implemented by a keyboard, a mouse, a touchscreen, a track-pad, a trackball, an isopoint, and/or a voice recognition system, among other examples.

One or more output devices 328 may also be connected to the interface circuit 324. The output devices 328 may be, comprise, or be implemented by display devices (e.g., a liquid crystal display (LCD), a light-emitting diode (LED) display, or cathode ray tube (CRT) display), printers, and/or speakers, among other examples. The processing system 310 may also communicate with one or more mass storage devices 330 and/or a removable storage medium 334, such as may be or include floppy disk drives, hard drive disks, compact disk (CD) drives, digital versatile disk (DVD) drives, and/or USB and/or other flash drives, among other examples.

The coded instructions 332 may be stored in the mass storage device 330, the main memory 317, the local memory 314, and/or the removable storage medium 334. Thus, the processing system 310 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code (i.e., software or firmware) thereon for execution by the processor 312.

The coded instructions 332 may include program instructions or computer program code that, when executed by the processor 312, may cause the wellsite system 100, 101, 102, the downhole tools 190, 192, 200, 202, the IOMs 201, 203, the actuators, and/or the sensors 265 to perform methods, processes, and/or routines described herein or otherwise within the scope of the present disclosure. For example, the coded instructions 332 may cause the processing system 310 to receive, process, and/or record the electronic downlink signals from the receiver 215, 270 and the sensor output data generated by the sensors 265. The processing system 310 may further generate the electronic uplink signals, which may be at least partially based on the electronic downlink signals and/or the sensor output data, and communicate the generated electronic uplink signals to the transmitter 230, 275 to be converted to carrier optical uplink signals, which may be multiplexed by the WDM 210, 280 and transmitted to the wellsite surface 105 via the single optical conductor or path 183 or transmitted to another downhole tool 190, 192, 200, 202 via the single optical conductor or path 185.

In view of the entirety of the present disclosure, including the claims and the figures, a person having ordinary skill in the art will readily recognize that the present disclosure introduces an apparatus comprising a downhole tool conveyable within a wellbore and able to optically communicate with surface equipment disposed at a wellsite surface from which the wellbore extends, wherein the downhole tool comprises: (A) a processing system secured within a housing of the downhole tool and comprising a processor and memory collectively operable to process electronic downlink signals and generate electronic uplink signals; (B) an integrated module able to receive multiplexed optical downlink signals originating from the surface equipment and transmit multiplexed optical uplink signals toward the surface equipment, wherein the integrated module comprises a plurality of components each attached to a frame secured within the housing, and wherein the plurality of components comprises: (1) a wavelength-division multiplexer/demultiplexer able to demultiplex the multiplexed optical downlink signals into carrier optical downlink signals, and to multiplex carrier optical uplink signals into the multiplexed optical uplink signals; (2) a receiver able to convert the carrier optical downlink signals into the electronic downlink signals; and (3) a transmitter able to convert the electronic uplink signals into the carrier optical uplink signals; and (C) circuitry able to communicate the electronic downlink signals and the electronic uplink signals to and from, respectively, the processing system.

The integrated module may further comprise an optical interface able to: receive the multiplexed optical downlink signals from the surface equipment; and transmit the multiplexed optical uplink signals to the surface equipment. Optical communication between the optical interface and the surface equipment may be via not more than one optical path. The optical path may terminate at a first connector, and the optical interface may comprise a second connector that detachably connects with the first connector to physically and optically couple the integrated module to the optical path. The second connector may be a pigtail connector. The optical interface may be a first optical interface, and the plurality of components may further comprise a second optical interface.

The downhole tool may further comprise a sensor operable to output data representative of a sensed parameter, and the processing system may be operable to generate the electronic uplink signals based on the sensor output data.

The receiver may comprise: a receiver device able to generate output signals representative of the carrier optical downlink signals; and a receiver circuit able to convert the output signals into the electronic downlink signals. The receiver device may comprise a photodiode.

The transmitter may comprise: a transmitter circuit able to convert the electronic uplink signals into output signals; and a transmitter device able to convert the output signals into the carrier optical uplink signals. The transmitter device may comprise a laser diode and/or a light-emitting diode.

The plurality of components may further comprise: a receiver buffer able to buffer the electronic downlink signals between the receiver and the circuitry; and a transmitter buffer able to buffer the electronic uplink signals between the circuitry and the transmitter.

The frame may be or comprise a printed circuit board comprising a plurality of electrical traces, and the circuitry may comprise ones of the electrical traces. The processing system may be mechanically and electrically coupled to the printed circuit board.

The processing system may be mechanically and electrically coupled to a printed circuit board comprising a plurality of electrical traces, and the circuitry may comprise ones of the electrical traces.

The plurality of components may further comprise an electrical interface in electrical communication with the receiver and the transmitter, and the circuitry may comprise an electrical cable extending between the processing system and the electrical interface.

The present disclosure also introduces an integrated optical module comprising: a frame; and a plurality of components each attached to the frame. The components include: a processing system operable to process electronic incoming signals and generate electronic outgoing signals; an optical interface able to receive multiplexed optical incoming signals and transmit multiplexed optical outgoing signals; a wavelength-division multiplexer/demultiplexer able to demultiplex the multiplexed optical incoming signals into carrier optical incoming signals, and to multiplex carrier optical outgoing signals into the multiplexed optical outgoing signals; a receiver able to convert the carrier optical incoming signals into the electronic incoming signals; and a transmitter able to convert the electronic outgoing signals into the carrier optical outgoing signals; and circuitry able to communicate the electronic incoming signals and the electronic outgoing signals to and from, respectively, the processing system.

The processing system may comprise a processor and memory collectively operable to process the electronic downlink signals and generate the electronic uplink signals.

The optical interface may be a first optical interface, and the plurality of components may also include a second optical interface able to receive the multiplexed optical incoming signals and transmit the multiplexed optical outgoing signals.

The plurality of components may also include a sensor operable to output data representative of a sensed parameter, and the processing system may be operable to generate the electronic outgoing signals based on the sensor output data.

The optical interface may comprise a connector. The connector may be a pigtail connector.

The receiver may comprise: a receiver device able to generate output signals representative of the carrier optical incoming signals; and a receiver circuit able to convert the output signals into the electronic incoming signals. The receiver device may comprise a photodiode.

The transmitter may comprise: a transmitter circuit able to convert the electronic outgoing signals into output signals; and a transmitter device able to convert the output signals into the carrier optical outgoing signals. The transmitter device may comprise a laser diode and/or a light-emitting diode.

The plurality of components may also include: a receiver buffer able to buffer the electronic incoming signals between the receiver and the circuitry; and a transmitter buffer able to buffer the electronic outgoing signals between the circuitry and the transmitter.

The frame may be or comprise a printed circuit board comprising a plurality of electrical traces, and the circuitry may comprise ones of the electrical traces. The processing system may be mechanically and electrically coupled to ones of the electrical traces.

The present disclosure also introduces an apparatus comprising a tool string conveyable within a wellbore and able to optically communicate with surface equipment disposed at a wellsite surface from which the wellbore extends. The tool string comprises a plurality of downhole tools connected end-to-end to form the tool string. The downhole tools each comprise respective instances of: (A) a processing system secured within a housing of the downhole tool and comprising a processor and memory collectively operable to process electronic downlink signals and generate electronic uplink signals; (B) an integrated module comprising a plurality of components each attached to a frame secured within the housing, wherein the plurality of components comprises: (1) an optical interface able to receive multiplexed optical downlink signals originating from the surface equipment, and to transmit multiplexed optical uplink signals toward the surface equipment; (2) a wavelength-division multiplexer/demultiplexer able to demultiplex the multiplexed optical downlink signals into carrier optical downlink signals, and to multiplex carrier optical uplink signals into the multiplexed optical uplink signals; (3) a receiver able to convert the carrier optical downlink signals into the electronic downlink signals; and (4) a transmitter able to convert the electronic uplink signals into the carrier optical uplink signals; and (C) circuitry able to communicate the electronic downlink signals and the electronic uplink signals to and from, respectively, the processing system.

The processing system and integrated module of each individual one of the downhole tools may be collectively able to: transmit, to the integrated module of a different one of the downhole tools, the multiplexed optical downlink signals originating from the surface equipment; receive additional multiplexed optical uplink signals from the integrated module of the different one of the downhole tools; and transmit the additional multiplexed optical uplink signals toward the surface equipment.

The optical interface of each downhole tool may be a first optical interface. The plurality of components of the integrated module of each downhole tool may also include a respective instance of a second optical interface. The downhole tools may include a first downhole tool and a second downhole tool. The multiplexed optical downlink signals originating from the surface equipment may be received by the first optical interface of the first downhole tool without passing through the first and second optical interfaces of the second downhole tool, and then: transmitted by the second optical interface of the first downhole tool to the first optical interface of the second downhole tool; and operationally utilized by at least one of the first and second downhole tools. Additional multiplexed optical uplink signals may be: generated by the second downhole tool; then transmitted by the first optical interface of the second downhole tool to the second optical interface of the first downhole tool; and then transmitted by the first optical interface of the first downhole tool toward the surface equipment. The integrated modules of the first and second downhole tools may be substantially identical in structure.

The integrated module of each downhole tool may be a first integrated module. Each downhole tool may also include a respective instance of a second integrated module substantially similar to the first integrated module. The downhole tools may include a first downhole tool and a second downhole tool. The multiplexed optical downlink signals originating from the surface equipment may be received by first integrated module of the first downhole tool without passing through the first and second integrated modules of the second downhole tool, and then: transmitted to the second integrated module of the first downhole tool; then transmitted by the second integrated module of the first downhole tool to the first integrated module of the second downhole tool; and then operationally utilized by at least one of the first and second downhole tools. Additional multiplexed optical uplink signals may be: generated by the second downhole tool; transmitted by the first integrated module of the second downhole tool to the second integrated module of the first downhole tool; then transmitted to the first integrated module of the first downhole tool; and then transmitted by the first integrated module of the first downhole tool toward the surface equipment. Each of the first and second integrated modules of each of the first and second downhole tools may be substantially identical in structure.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
  a first downhole tool and a second downhole tool connected in a tool string conveyable within a wellbore and able to optically communicate with surface equipment disposed at a wellsite surface from which the wellbore extends, wherein the first downhole tool and the second downhole tool each comprises respective instances of:
    a housing;
    a processing system secured within the housing of the downhole tool and comprising a processor and memory collectively operable to process electronic downlink signals and generate electronic uplink signals;
    an integrated module disposed within the housing of the downhole tool and able to receive multiplexed optical downlink signals originating from the surface equipment and transmit multiplexed optical uplink signals toward the surface equipment, wherein the integrated module comprises a plurality of components each physically supported by a frame secured within the housing, and wherein the plurality of components comprises:
      a wavelength-division multiplexer/demultiplexer able to demultiplex the multiplexed optical downlink signals into carrier optical downlink signals, and to multiplex carrier optical uplink signals into the multiplexed optical uplink signals;
      a receiver able to convert the carrier optical downlink signals into the electronic downlink signals; and
      a transmitter able to convert the electronic uplink signals into the carrier optical uplink signals; and
    circuitry able to communicate the electronic downlink signals and the electronic uplink signals to and from, respectively, the processing system.

2. The apparatus of claim 1 wherein the integrated module further comprises an optical interface able to:
  receive the multiplexed optical downlink signals from the surface equipment; and
  transmit the multiplexed optical uplink signals to the surface equipment.

3. The apparatus of claim 2 wherein optical communication between the optical interface and the surface equipment is via not more than one optical path.

4. The apparatus of claim 3 wherein the optical path terminates at a first connector, and wherein the optical interface comprises a second connector that detachably connects with the first connector to physically and optically couple the integrated module to the optical path.

5. The apparatus of claim 4 wherein the second connector is a pigtail connector.

6. The apparatus of claim 2 wherein the optical interface is a first optical interface, and wherein the plurality of components further comprises a second optical interface.

7. The apparatus of claim 1 wherein at least one of the first downhole tool and the second downhole tool further comprises a sensor operable to output data representative of a sensed parameter, and wherein the processing system is operable to generate the electronic uplink signals based on the sensor output data.

8. The apparatus of claim 1 wherein the receiver comprises:
  a receiver device able to generate output signals representative of the carrier optical downlink signals, wherein the receiver device comprises a photodiode; and
  a receiver circuit able to convert the output signals into the electronic downlink signals.

9. The apparatus of claim 1 wherein the transmitter comprises:
  a transmitter circuit able to convert the electronic uplink signals into output signals; and
  a transmitter device able to convert the output signals into the carrier optical uplink signals, wherein the transmitter device comprises at least one of laser diode and/or a light-emitting diode.

10. The apparatus of claim 1 wherein the plurality of components further comprises:
  a receiver buffer able to buffer the electronic downlink signals between the receiver and the circuitry; and
  a transmitter buffer able to buffer the electronic uplink signals between the circuitry and the transmitter.

11. The apparatus of claim 1 wherein the frame is or comprises a printed circuit board comprising a plurality of electrical traces, and wherein the circuitry comprises ones of the electrical traces.

12. The apparatus of claim 1 wherein the processing system is mechanically and electrically coupled to a printed circuit board comprising a plurality of electrical traces, and wherein the circuitry comprises ones of the electrical traces.

13. The apparatus of claim 1 wherein the plurality of components further comprises an electrical interface in electrical communication with the receiver and the transmitter, and wherein the circuitry comprises an electrical cable extending between the processing system and the electrical interface.

14. The apparatus of claim 1 wherein the tool string is coupled to coiled tubing conveyable within the wellbore and is able to optically communicate with coiled tubing surface equipment disposed at a wellsite surface.

15. An apparatus comprising:
a tool string conveyable within a wellbore and able to optically communicate with surface equipment disposed at a wellsite surface from which the wellbore extends, wherein the tool string comprises a plurality of downhole tools connected end-to-end to form the tool string, and wherein the downhole tools each comprise respective instances of:
a processing system secured within a housing of the downhole tool and comprising a processor and memory collectively operable to process electronic downlink signals and generate electronic uplink signals;
an integrated module comprising a plurality of components each attached to a frame secured within the housing, wherein the plurality of components comprises:
an optical interface able to receive multiplexed optical downlink signals originating from the surface equipment, and to transmit multiplexed optical uplink signals toward the surface equipment;
a wavelength-division multiplexer/demultiplexer able to demultiplex the multiplexed optical downlink signals into carrier optical downlink signals, and to multiplex carrier optical uplink signals into the multiplexed optical uplink signals;
a receiver able to convert the carrier optical downlink signals into the electronic downlink signals; and
a transmitter able to convert the electronic uplink signals into the carrier optical uplink signals; and
circuitry able to communicate the electronic downlink signals and the electronic uplink signals to and from, respectively, the processing system.

16. The apparatus of claim 15 wherein the processing system and integrated module of each individual one of the downhole tools are collectively able to:
transmit, to the integrated module of a different one of the downhole tools, the multiplexed optical downlink signals originating from the surface equipment;
receive additional multiplexed optical uplink signals from the integrated module of the different one of the downhole tools; and
transmit the additional multiplexed optical uplink signals toward the surface equipment.

17. The apparatus of claim 15 wherein:
the optical interface of each downhole tool is a first optical interface;
the plurality of components of the integrated module of each downhole tool also includes a respective instance of a second optical interface;
the downhole tools include a first downhole tool and a second downhole tool;
the multiplexed optical downlink signals originating from the surface equipment are:
received by the first optical interface of the first downhole tool without passing through the first and second optical interfaces of the second downhole tool; and then
transmitted by the second optical interface of the first downhole tool to the first optical interface of the second downhole tool; and
operationally utilized by at least one of the first and second downhole tools;
additional multiplexed optical uplink signals are:
generated by the second downhole tool; then
transmitted by the first optical interface of the second downhole tool to the second optical interface of the first downhole tool; and then
transmitted by the first optical interface of the first downhole tool toward the surface equipment; and
the integrated modules of the first and second downhole tools are substantially identical in structure.

18. The apparatus of claim 15 wherein:
the integrated module of each downhole tool is a first integrated module;
each downhole tool also includes a respective instance of a second integrated module substantially similar to the first integrated module;
the downhole tools include a first downhole tool and a second downhole tool;
the multiplexed optical downlink signals originating from the surface equipment are:
received by first integrated module of the first downhole tool without passing through the first and second integrated modules of the second downhole tool; and then
transmitted to the second integrated module of the first downhole tool; then
transmitted by the second integrated module of the first downhole tool to the first integrated module of the second downhole tool; and then
operationally utilized by at least one of the first and second downhole tools;
additional multiplexed optical uplink signals are:
generated by the second downhole tool;
transmitted by the first integrated module of the second downhole tool to the second integrated module of the first downhole tool; then
transmitted to the first integrated module of the first downhole tool; and then
transmitted by the first integrated module of the first downhole tool toward the surface equipment; and
each of the first and second integrated modules of each of the first and second downhole tools are substantially identical in structure.

19. The apparatus of claim 15 wherein the tool string is coupled to coiled tubing and is able to optically communicate with coiled tubing surface equipment.

* * * * *